United States Patent [19]
Gaylord et al.

[11] 4,269,956
[45] May 26, 1981

[54] PEROXYGEN COMPOUND-METAL CARBOXYLATE REDOX CATALYST SYSTEM FOR VINYL CHLORIDE POLYMERIZATION

[75] Inventors: Norman G. Gaylord, New Providence; Meshulam Nagler, Irvington, both of N.J.

[73] Assignee: Dart Industries Inc., Los Angeles, Calif.

[21] Appl. No.: 106,325

[22] Filed: Dec. 21, 1979

[51] Int. Cl.$^3$ .............................................. C08F 14/06
[52] U.S. Cl. ................................................... 526/192
[58] Field of Search ................ 526/192, 193, 208, 213

[56] References Cited
U.S. PATENT DOCUMENTS

| 2,508,801 | 5/1950 | Sans | 526/192 |
| 2,981,724 | 4/1961 | Holdsworth | 526/192 |
| 2,996,490 | 8/1961 | Rowland et al. | 526/192 |
| 3,167,533 | 1/1965 | Donat | 526/192 |
| 3,515,705 | 6/1970 | Balitrand | 526/192 |
| 3,739,043 | 6/1973 | Fryd et al. | 526/192 |
| 3,739,044 | 6/1973 | Wald | 526/192 |
| 3,997,707 | 12/1976 | Aruga et al. | 526/192 |
| 4,091,197 | 5/1978 | Fischer et al. | 526/192 |

Primary Examiner—William F. Hamrock
Attorney, Agent, or Firm—Bryant W. Brennan; Harold R. Beck

[57] ABSTRACT

A process for the bulk or suspension polymerization of vinyl chloride, in the presence of a redox catalyst system consisting of a peroxyester or diacyl peroxide, a stannous or antimony (III) carboxylate and a complexing agent.

12 Claims, No Drawings

PEROXYGEN COMPOUND-METAL CARBOXYLATE REDOX CATALYST SYSTEM FOR VINYL CHLORIDE POLYMERIZATION

FIELD OF THE INVENTION

This invention relates to a process for the polymerization of vinyl chloride, in bulk or suspension systems, using a redox catalyst system consisting of a peroxyester or a diacyl peroxide, a stannous or antimony (III) carboxylate and a complexing agent.

BACKGROUND OF THE INVENTION

The suspension polymerization of vinyl chloride is generally carried out at temperatures below 70° C. using organic soluble initiators. Although lauroyl peroxide was earlier the most widely used catalyst, in recent years other low temperature catalysts including azobisisobutyronitrile, diisopropyl peroxydicarbonate, t-butyl peroxypivalate and mixtures thereof, have been adopted. These and other catalysts are described in Pennwalt Corporation, Lucidol Division, Technical Bulletin 30.90, "Free Radical Initiators for the Suspension Polymerization of Vinyl Chloride" (1977).

The choice of initiator is dictated by its half-life and by its influence on the polymerization process and the properties of the poly(vinyl chloride) produced thereby.

The polymerization of vinyl chloride is characterized by a short induction period, followed by a gradually increasing rate of polymerization. During the earlier stages of the polymerization, the reaction rate is lower than the maximum so that the capacity of the reactor is not fully utilized. Peroxyesters reduce the induction period and, due to a more constant rate of polymerization, increase reactor productivity. Further, peroxyesters can generally be used at levels below that needed for peroxides and give much less chain branching during polymerization.

Although peroxyesters such as diisopropyl peroxydicarbonate and t-butyl peroxypivalate offer numerous advantages in vinyl chloride polymerization, their disadvantages include the necessity for low temperature shipping and storage and decreased efficiency at elevated temperatures.

The use of peroxyesters having higher decomposition temperatures is not feasible in present poly(vinyl chloride) production facilities due to the higher monomer pressures involved and the low molecular weight and poorer stability of the resultant resins. Nevertheless, the handling advantages of such peroxyesters makes their use extremely attractive.

The use of higher temperature catalysts at lower temperatures is a common practice in polymer technology. Thus, redox systems such as ammonium persulfate - sodium metabisulfite and hydrogen peroxide - ferrous sulfate are used in emulsion polymerization while benzoyl peroxide - dimethylaniline and methyl ethyl ketone peroxide - cobalt naphthenate are used in styrene - unsaturated polyester polymerization.

Reducing agents used in conjunction with monomer-soluble peroxyesters in the polymerization of vinyl chloride include potassium metabisulfite (N. Fischer and C. Lambling, French Pat. No. 2,086,635 (1972), sodium bisulfite (H. Minato, K. Hashimoto, and T. Yasui, Japan Pat. No. 68 20,300 (1968), sodium bisulfite - cupric chloride (B. K. Shen, U.S. Pat. No. 3,668,194 (1972), sodium dithionite - ferrous sulfate (H. Minato, Japan Pat. No. 70 04,994 (1970) and trialkyl boron (R. Kato and I. Soematsu, Japan Pat. No. 5498('65) (1965); A. V. Ryabov, V. A. Dodonov, and Y. A. Ivanova, Tr. Khim. Khim. Tekknol., 1970, 238; Stockholms Superfosfat Fabriks A/B, Brit. Pat. No. 961,254 (1964). The water-soluble reducing agents are more suitable for emulsion than for bulk or suspension polymerization while the trialkyl borons react with oxygen and require special handling.

SUMMARY OF THE INVENTION

An object of the present invention is to provide a process for the polymerization of vinyl chloride, in the presence of peroxygen compounds at temperatures at which the latter are stable and readily handled. Another object of the present invention is to provide a process for the bulk and suspension polymerization of vinyl chloride at temperatures below 70° C. using peroxygen compounds which, at these temperatures, do not generate free radicals at a sufficient rate to initiate polymerization at a practical rate, if at all.

It has now been found that this improvement in vinyl chloride polymerization can be achieved by utilizing a redox catalyst system consisting of a peroxyester or a diacyl peroxide, a stannous or antimony (III) carboxylate and a complexing agent.

DETAILED DESCRIPTION OF THE INVENTION

In co-pending appliction Ser. No. 106,332, filed Dec. 21, 1979, it was disclosed that the polymerization of vinyl chloride may be carried out in bulk or suspension, under the conditions applicable thereto and well known to those skilled in the art, using a redox catalyst system consisting of a monomersoluble peroxyester or diacyl peroxide and a reducing agent which is a stannous or antimony (III) salt of a carboxylic acid. According to the present invention, the polymerization process is improved by the addition of a complexing agent to the redox catalyst system.

The half-life of a free radical catalyst is the time required for 50% decomposition at a particular temperature. The half-life is only relevant as regards the temperature at which it is desired to conduct a polymerization, e.g. the polymerization of vinyl chloride below 70° C. to produce poly(vinyl chloride) with greater thermal stability than polymer produced above 70° C. The half-life of a peroxyester refers to thermal decomposition and, consequently, if a polymerization is to be conducted at 50° C., a catalyst with a half-life of 20 hours or less at 50° C., can be used for the polymerization, e.g. t-butyl peroxypivalate or t-butyl peroxyneodecanoate, as is well known to those skilled in the art.

However, if it is desired to conduct the polymerization with a catalyst which does not require refrigerated shipment and/or storage, which are required by t-butyl peroxypivalate and t-butyl peroxyneodecanoate, than in accordance with the present invention, a catalyst with a half-life of more than 50 hours at 50° C. can be used in the presence of a suitable reducing agent, e.g. t-butyl peroxyoctoate which has a half-life of 133 hours at 50° C. in the absence of the reducing agent may be used.

Alternatively, if it is desired to conduct polymerization at or below 25° C., in order to maintain better control of the reaction exotherm or to obtain a higher molecular weight, less branched polymer, the aforementioned peresters, despite the requirement for refrigerated shipping and storage, having half-lives of more than 150 hours at 25° C., may be used in the presence of a suitable reducing agent.

The process of the present invention utilizes a peroxygen compound such as a peroxyester and a diacyl peroxide, in the presence of a suitable reducing agent, at a temperature where the peroxygen compound has a half-life of more than 50 hours in the absence of the reducing agent.

The peroxyesters which may be used in the process of the present invention are the alkyl and aralkyl peroxyesters of aliphatic or aromatic carboxylic acids or carbonic acid and may be represented by the structural formula

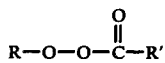

where R is an alkyl, aralkyl or alkoxycarbonyl group, R' is an alkyl, aralkyl, aryl or alkoxy group, and R and R' are the same or different. When R and/or R' contain alkyl or aralkyl moieties, the latter may contain 1–20 carbon atoms and may be primary, secondary or tertiary, linear or branched, acyclic or cyclic, saturated or unsaturated and may contain non-hydrocarbon substituents including halogen and hydroxyl groups. When R' is an aromatic moiety, it may be unsubstituted or may contain hydrocarbon, halogen and/or other substituents.

The peroxyesters may be monoperoxyesters or the diperoxyesters of dicarboxylic acids or diols.

Representative peroxyesters include t-butyl peroxyacetate, t-butyl peroxyisobutyrate, t-butyl peroxypivalate, t-butyl peroxynedecanoate, t-butyl peroxybenzoate, t-butyl peroxyoctoate, t-butyl peroxy (2-ethylhexanoate), t-amyl peroxyneodecanoate, cumyl neodecanoate, isobutyl peroxypivalate, sec-butyl peroxybenzoate, n-butyl peroxyoctoate, t-butyl peroxy-3,3,5-trimethylhexanoate, t-butyl peroxy-2-methylbenzoate, 2,5-dimethyl-2,5-bis(2-ethylhexanoylperoxy)hexane, 2,5-dimethyl-2,5-bis(benzoylperoxy)hexane, 2,5-dimethyl-2,5-bis(octanoylperoxy)-hexane, di-t-butyl diperoxyphthalate, t-butyl peroxymaleic acid, t-butyl peroxyisopropylcarbonate, di(sec-butyl) peroxydicarbonate, bis(4-t-butylcyclohexyl)peroxydicarbonate, diisopropyl peroxydicarbonate, di(n-propyl)peroxydicarbonate, di(2-ethylhexyl)peroxy-dicarbonate, dicyclohexyl peroxydicarbonate, dicetyl peroxydicarbonate and the lilke.

Aliphatic diacyl peroxides including acetyl peroxide, lauroyl peroxide, decanoyl peroxide and isononanoyl peroxide, as well as aromatic diacyl peroxides including benzoyl peroxide, p-chlorobenzoyl peroxide and 2,4-dichlorobenzoyl peroxide may be used in conjunction with the reductants of the present invention at a temperature where the diacyl peroxide has a half-life of more than 50 hours in the absence of the reductant.

The process of the present invention is carried out with a redox catalyst system consisting of a monomer-soluble peroxygen compound and a reductant. In bulk polymerization, a monomer-soluble reductant is required, while suspension polymerization permits the use of either a monomer-soluble or a monomer-insoluble reductant.

The stannous and antimony (III) salts which may be used as reductants in the practice of the present invention include the stannous and antimony (III) salts of aliphatic and aromatic carboxylic acids. The aliphatic carboxylic acids contain 1–26 carbon atoms and may be linear or branched with hydrocarbon or non-hydrocarbon substituents such as halogen groups, cyclic or acyclic, saturated or unsaturated and monocarboxylic or polycarboxylic. The aromatic carboxylic acids may be monocarboxylic or polycarboxylic, unsubstituted or substituted with hydrocarbon or non-hydrocarbon substituents. The hydrocarbon substituents in the branched aliphatic carboxylic acids or the aromatic carboxylic acids may be alkyl or aryl groups where the alkyl groups contain 1–18 carbon atoms and may be linear or branched, cyclic or acyclic, saturated or unsaturated.

Representative carboxylates include the stannous and antimony (III) salts of acetic acid, propionic acid, butanoic acid, pentanoic acid, 2-methylbutanoic acid, caproic acid, 3-methylpentanoic acid, caprylic acid, octanoic acid, 2-ethylhexanoic acid, enanthic acid, capric acid, pelargonic acid, undecanoic acid, lauric acid, myristic acid, palmitic acid, stearic acid, arachidic acid, behenic acid, lignoceric acid, cerotic acid, oxalic acid, malonic acid, succinic acid, glutaric acid, adipic acid, sebacic acid, dodecenylsuccinic acid, hexahydrophthalic acid, tetrahydrophthalic acid, oleic acid, elaidic acid, linoleic acid, α-eleostearic acid, β-eleostearic acid, α-linolenic acid, erucic acid, ricinoleic acid, maleic acid, fumaric acid, itaconic acid, crotonic acid, cinnamic acid, benzoic acid, aconitic acid, phthalic acid, citraconic acid, isophthalic acid, terephthalic acid, naphthoic acid and the like.

The peroxygen compound/reductant mole ratio is generally 1/0.01–2, with a preferred mole ratio of 1/0.1–1.

The concentration of peroxygen compound is generally 0.01–5% by weight of the vinyl chloride, with a preferred concentrationof 0.05–1% by weight. However, the concentrations of both peroxygen compound and reductant may be reduced by the addition of complexing agents which contain suitable functional groups.

Monomeric vinyl chloride and stannous and antimony (III) carboxylates form a complex or other product which reduces the availability of the reductant for the redox reaction with the peroxygen compound. As shown in Example I, the product contains about 2 moles of stannous carboxylate per mole of vinyl chloride.

EXAMPLE I

Mixtures of stannous octoate (SnOct) and vinyl chloride (VCM) were charged into glass bottles and placed in a constant temperature bath at 50° C. for 2–4 hours. The bottles were removed from the bath and the excess vinyl chloride was vented. The residue was then either (1) subjected to 1 mm Hg pressure at 25° C. for 30 minutes, (2) dispersed in 2 ml hexane, followed by bubbling nitrogen through the mixture for 1 hour at 25° C., or (3) heated at 50° C. at atmospheric pressure for 1 hour.

| Charge | | | |
|---|---|---|---|
| VCM, mmoles | 160 | 240 | 320 |
| SnOct, mmoles | 2.57 | 3.60 | 22.63 |
| VCM/SnOct mole ratio | 62/1 | 67/1 | 14/1 |
| Time at 50° C., hours | 4 | 2 | 2 |
| Residue | | | |
| Treatment No. | 1 | 2 | 3 |
| VCM/SnOct mole ratio | 0.61/1 | 0.44/1 | 0.66/1 |

The decomposition of a peroxyester such as t-butyl peroxyoctoate in the presence of a stannous carboxylate at a peroxyester/stannous carboxylate mole ratio of 1/0.5, using kerosene as a reaction medium, proceeds only to the extend of about 50% after 1 hour at 50° C. and then remains relatively unchanged for up to 22 hours at 50° C.

The presence of vinyl chloride decreases the extent of peroxyester decomposition to an even greater extent, presumably due to the unavailability of the reductant which is complexed with the monomer. However, when a complexing agent containing carbonyl functionality is present, the reductant is apparently released by the vinyl chloride and the peroxyester undergoes complete decomposition, even in the presence of the monomer, as shown in Example II.

EXAMPLE II

Five glass bottles with a screw cap with a center hole and a self-sealing gasket were each charged with the following suspension recipe:

21 ml distilled water (boiled)

1 ml 1% aqueous solution of Tween 60 (polyoxyethylenesorbitan monostearate, Atlas Chemical Industries Inc.)

1 ml 1% solution of Span 60 (sorbitan monostearate, Atlas Chemical Industries Inc.)

2 ml 1% aqueous solution of Methocel A-15 (methylcellulose, 15 cps viscosity as 2% aqueous solution, Dow Chemical Co.)

Nitrogen was bubbled through the aqueous solution for 15 minutes. Stannous laurate (SnLrt), 0.536 g (1.035 mmoles), was added, followed by 10 liquified vinyl chloride monomer. The bottles were capped and 0.5 ml (2.07 mmoles) t-butyl peroxyoctoate (tBPO) was then injected into the bottoms through the self-sealing gasket. Dioctyl phthalate (DOP) was then injected into the bottles in varying amounts. The bottles were shaken in a constant temperature bath at 50° C., removed after 7 or 16 hours and analyzed for peroxyester content by iodometric titration in acetic acid, using stannous chloride as reducing agent and back titrating the excess stannous chloride with potassium iodate solution. The results summarized in the following table clearly demonstrate the effect of DOP on the extent of peroxyester decomposition:

| DOP, ml (mmole) | 0 | 0.2(0.52) | | 0.4(1.035) | |
|---|---|---|---|---|---|
| SnLrt/DOP mole ratio | 1/0 | 1/0.5 | | 1/1 | |
| Time, hours | 7 | 7 | 16 | 7 | 16 |
| tBPO decomposition, % | 18 | 80 | 100 | 80 | 100 |

The increased rate and extent of decomposition of a peroxyester or diacyl peroxide in the presence of the complexing agent is accompanied by an increase in the rate and extent of polymerization of vinyl chloride. The presence of the complexing agent in the practice of the process of the present invention permits the use of lower concentrations of the peroxygen compound and the reductant to achieve similar or superior results to those obtained in the absence of the complexing agent at higher concentrations of the redox catalyst composition.

The complexing agents which may be used in the process of the present invention are organo-soluble and contain carbonyl groups or phosphorous-oxygen linkages. Thus, ketones, carboxylic acids and esters and phosphate esters are effective complexing agents. The latter may be saturated or unsaturated, cyclic or acyclic, branched or linear, substituted or unsubstituted.

Representative ketones include 2-butanone, 2-pentanone, 3-pentanone, 4-hexanone, 4-methyl-2-pentanone, 2,4-dimethyl-3-pentanone, 4-heptanone, 2-nonanone, 6-undecanone, 9-heptadecanone, 2-decanone, diacetone alcohol, cyclopentanone, cyclohexanone, cycloheptanone, acetophenone, propiophenone and the like.

Representative carboxylic acids include propionic, butyric, isobutyric, valeric, isovaleric, caproic, enanthic, caprylic, capric, 2-ethylhexanoic, pelargonic, lauric, adipic, pimelic, suberic, benzoic, chloroacetic, phthalic and the like.

Representative esters include dioctyl phthalate, dibutyl phthalate, dioctyl adipate, di-2-ethylhexyl sebacate, dioctyl azelate, dibutyl pelargonate and the like. The compounds which are normally used as plasticizers for poly(vinyl chloride) are particularly useful in the practice of the process of the present invention. Representative monomeric and polymeric plasticizers are described in Encyclopedia of Polymer Science and Technology, 10, 247–259 (1969), the disclosure of which is incorporated herein by reference. Phosphate esters including those used as plasticizers and containing P—O linkages, e.g. triethyl phosphate, tricresyl phosphate, etc., are also effective as complexing agents in the practice of this invention.

The stannous or antimony (III) carboxylate/complexing agent mole ratio may be 1/0.1–4 and the preferred range is 1/0.5–2.

The procedures normally used in the bulk and suspension polymerization of vinyl chloride are applicable to the process of the present invention. Typical procedures are described in Encyclopedia of Polymer Science and Technology, 14, 339–343 (1971), the disclosure of which is incorporated herein by reference.

The polymerization may be conducted at or above atmospheric pressure. In the usual procedure, the reactor is charged at atmospheric pressure and the pressure rises when the contents of the reactor are brought to reaction temperature. The pressure may increase further due to the reaction exotherm and then remain constant until the conversion reaches about 70%, after which it decreases rapidly as the reaction continues.

The polymerization temperature may range from −50° to +70° C. for bulk polymerization, although temperatures of 40° to 60° C. are preferred. Suspension polymerization may be carried out at temperatures of +5° to +60° C., although preferred temperatures are in the 20–60° C. range.

The concentrations of monomer and water, e.g. about 2/1 weight ratio, and the types and concentrations of suspending agents are those normally used in suspension polymerization and are well known to those skilled in the art. Typical suspending agents include poly(vinyl alcohol), partially saponified poly(vinyl acetate), gelatin, methylcellulose, vinyl acetate-maleic anhydride copolymer and the like. Various emulsifiers such as sulfonated oils and ethylene oxide condensation products may be added to control surface tension and particle shape. Buffers may be used, where necessary, e.g. when gelatin is used as suspending agent. Chain transfer agents such as chlorinated hydrocarbons and isobutylene may be used in the preparation of low molecular weight polymer.

Although the peroxygen compound-reductant-complexing agent catalyst system of the present invention is particularly useful in the bulk and suspension polymerization of vinyl chloride, the redox system may also be used in the copolymerization of vinyl chloride with vinylidene chloride, vinyl acetate and other monomers which undergo copolymerization with vinyl chloride.

The following examples are illustrative embodiments of the practice of the present invention and are not to be construed as limitations on the invention or the claims. Numerous modifications will be obvious to those skilled in the art.

EXAMPLE III

Four 100 ml glass bottles equipped with screw caps with a center hole and a self-sealing gasket were charged with the following suspension recipe:

21 ml distilled water (boiled)
1 ml 1% aqueous solution of Tween 60
1 ml 1% aqueous solution of Span 60
2 ml 1% aqueous solution of Methocel A-15

Nitrogen was bubbled through the aqueous solution for 15 minutes.

Gaseous vinyl chloride was purified by passage through two 5% sodium hydroxide solutions, dried by passage through a silica gel column and then condensed with the aid of a dry ice bath. After 10 g liquid vinyl chloride was added to the suspension recipe, the bottle was capped. The addition of 0.125 g (0.23 mmole) stannous laurate and 0.11 ml (0.46 mmole) t-butyl peroxyoctoate (1% by weight of vinyl chloride) was made by injection through the gasket using a hypodermic syringe. The bottles were placed in a 50° C. constant temperature bath and shaken for 6-15 hours. Bottles were removed at intervals and the residual monomer was released by inserting a needle into the gasket. The conversions, as a function of reaction time, are shown in the following table.

| No. | Reaction time, hrs | Conversion, % |
|---|---|---|
| 1 | 6 | 40 |
| 2 | 8 | 65 |
| 3 | 10 | 90 |
| 4 | 15 | 96 |

EXAMPLE IV

The procedure of Example III was repeated with four bottles, using the same suspension recipe, with 10 g vinyl chloride, 0.062 g (0.115 mmole) stannous laurate and 0.055 ml (0.23 mmole) t-butyl peroxyoctoate (0.5% by weight of vinyl chloride). The conversions, as a function of reaction time at 50° C., are shown in the following table.

| No. | Reaction time, hrs | Conversion, % |
|---|---|---|
| 1 | 6 | 38 |
| 2 | 9 | 45 |
| 3 | 13 | 50 |
| 4 | 16 | 51 |

EXAMPLE V

The polymerization of 10 g vinyl chloride in the presence of 0.062 g (0.115 mmole) stannous laurate and 0.055 ml (0.23 mmole) t-butyl peroxyoctoate (0.5% by weight of vinyl chloride) was conducted at 50° C., using the procedure and suspension recipe of Example III. The bottles also contained 0.088 ml (0.23 mmole) dioctyl phthalate (DOP). The conversions, as compared to the results obtained in the absence of DOP, are shown in the following table.

| No. | Reaction time, hrs | DOP | Conversion, % |
|---|---|---|---|
| 1 | 9 | absent | 45 |
| 2 | 9 | present | 68 |
| 3 | 16 | absent | 51 |
| 4 | 16 | present | 73 |

EXAMPLE VI

A. The polymerization of 10 g vinyl chloride was carried out at 50° C. in the presence of 0.025 g (0.046 mmole) stannous laurate and 0.023 ml (0.092 mmole) t-butyl peroxyoctoate (0.2% by weight of vinyl chloride), using the procedure and suspension recipe of Example III. The conversion was 15% after 7 hours at 50° C.

B. The polymerization in A was repeated with 0.036 ml (0.092 mmole) dioctyl phthalate in the charge. The conversion was 23% after 7 hours at 50° C.

EXAMPLE VII

The polymerization of 10 g vinyl chloride in the presence of 0.23 mmole (0.5% by weight of vinyl chloride) of t-butyl peroxyoctoate and 0.115 mmole stannous laurate was carried out at 55° C. in the absence and in the presence of 0.23 mmole dioctyl phthalate, using the procedure and suspension recipe of Example III. After 9 hours at 55° C., the conversion was 60% in the absence of DOP and 83% in the presence of DOP.

EXAMPLE VIII

The polymerization of vinyl chloride described in Example V, with 0.5% t-butyl peroxyoctoate (tBPO) and a 1/0.5 mole ratio of t-BPO/Stannous Laurate was carried out at 50° C. in the presence of dioctyl adipate (DOA) with a SnLaurate/DOA mole ratio of ½. After 9 hours at 50° C. the conversion was 65% as compared to the conversion of 45% obtained in the absence of DOA.

EXAMPLE IX

The polymerization of vinyl chloride described in Example VIII was carried out in the presence of 2-ethylhexanoic acid in lieu of DOA. After 9 hours at 50° C. the conversion was 64%.

EXAMPLE X

The polymerization of vinyl chloride described in Example VIII was carried out in the presence of triethyl phosphate (TEP) at a SnLaurate/TEP mole ratio of ½. After 9 hours at 50° C. the conversion was 65% as compared to 45% in the absence of TEP.

EXAMPLE XI

The polymerization of vinyl chloride described in Example VIII was carried out in the presence of cyclohexanone (SnLaurate/cyclohexanone mole ratio ½). After 9 hours at 50° C. the conversion was 60° C.

EXAMPLE XII

A. The procedure of Example III was repeated with two bottles, using the same suspension recipe, with 10 g vinyl chloride, 0.055 ml (0.23 mmole) t-butyl peroxyoctoate (0.5% by weight of vinyl chloride) and 0.035 ml (0.115 mmole) stannous octoate. After 12 hours at 50° C.

the conversion was 45% and had not increased after 16 hours.

B. The polymerization in A was repeated with 0.044 ml (0.115 mmole) dioctyl phthalate in the charge. The conversion was 55% after 16 hours at 50° C.

U.S. Pat. No. 4,091,197 discloses a microsuspension process for the polymerization of vinyl chloride in the presence of a seed consisting of a previously prepared dispersion of poly(vinyl chloride) containing an organo-soluble initiator, wherein the initiator is activated during the polymerization by an "organo-soluble metal complex formed throughout the polymerization by reacting a water-soluble salt of various metals, including tin, with a complexing agent progressively introduced throughout the polymerization." Stannic chloride is indicated as one of the water-soluble salts which are used in the disclosed process in conjunction with complexing agents which "cause the metal to change from its water-soluble form to an organo-soluble form" and which include lactones, carboxylic acids and ketones.

The process of the present invention utilizes an organo-soluble stannous carboxylate in conjunction with the complexing agent and is not anticipated by the disclosure of U.S. Pat. No. 4,091,197 since the stannous carboxylate is not a water-soluble salt and the complexing agent does not function to render it organo-soluble.

While particular embodiments of this invention have been disclosed above, it will be understood that the invention is obviously subject to variation and modification without departing from its broader aspects.

What is claimed is:

1. A process for the preparation of polymers and copolymers of vinyl chloride, which consists in polymerization in bulk or suspension, at a temperature of 70° C. or below in the presence of a redox catalyst system consisting essentially of a peroxygen compound selected from the class consisting of peroxyesters and diacyl peroxides, a reduced agent selected from the class consisting of stannous carboxylates and antimony (III) carboxylates, and a complexing agent and where the peroxygen compound/reducing agent mole ratio is 1/0.01–2 and wherein the polymerization is carried out at a temperature wherein the peroxygen compound has a half-life of more than 50 hours in the absence of the reducing agent.

2. The process of claim 1 wherein said polymerization temperature is in the range from −50° to +70° C.

3. The process of claim 1 wherein said polymerization temperature is between 20° and 60° C.

4. The process of claim 1 wherein said peroxyester is selected from the class consisting of peroxyesters of aliphatic carboxylic acids, aromatic carboxylic acids and carbonic acid.

5. The process of claim 1 wherein said reducing agent is the stannous or antimony (III) salt of an aliphatic or aromatic carboxylic acid.

6. The process of claim 5 wherein said stannous carboxylate is selected from the class consisting of stannous octoate, stannous laurate and stannous stearate.

7. The process of claim 4 wherein said peroxyester is t-butyl peroxyoctoate.

8. The process of claim 1 wherein said diacyl peroxide is selected from the class consisting of lauroyl peroxide and benzoyl peroxide.

9. The process of claim 1 wherein said antimony (III) carboxylate is antimony triacetate.

10. The process of claim 1 wherein said complexing agent is selected from the class consisting of ketones, carboxylic acids, carboxylic esters and compounds containing a phosphorous-oxygen linkage.

11. The process of claim 1 wherein said complexing agent is a plasticizer for poly(vinyl chloride).

12. The process of claim 10 wherein said compound containing a phosphorous-oxygen linkage is a phosphate ester.

* * * * *

UNITED STATES PATENT AND TRADEMARK OFFICE
CERTIFICATE OF CORRECTION

PATENT NO. : 4,269,956  
DATED : May 26, 1981  
INVENTOR(S) : Norman Grant Gaylord et al.

Page 1 of 2

It is certified that error appears in the above-identified patent and that said Letters Patent are hereby corrected as shown below:

Column 2, line 36 - "monomersoluble" should read -- monomer-soluble -- .

Column 3, line 34 - "peroxynedecanoate" should read -- peroxyneodecanoate -- .

Column 3, line 49 - "lilke" should read -- like -- .

Column 4, line 35 - "concentrationof" should read -- concentration of -- .

Column 5, line 5 - "extend" should read -- extent -- .

Column 5, line 26 - after "1%" add -- aqueous -- .

Column 5, line 33 - after "10" add -- g -- .

Column 5, line 36 - "bottoms" should read -- bottles -- .

Column 6, line 50 - "+60°C." should read -- +70°C. -- .

Column 8, line 61 - "60°C" should read -- 60% -- .

UNITED STATES PATENT AND TRADEMARK OFFICE
CERTIFICATE OF CORRECTION

PATENT NO. : 4,269,956
DATED : May 26, 1981
INVENTOR(S) : Norman Grant Gaylord et al.

It is certified that error appears in the above–identified patent and that said Letters Patent are hereby corrected as shown below:

Column 9, line 24 — "the complexing" should read -- a complexing -- .

Column 9, line 39 — "reduced" should read -- reducing -- .

Signed and Sealed this

Fifteenth Day of September 1981

[SEAL]

Attest:

GERALD J. MOSSINGHOFF

Attesting Officer    Commissioner of Patents and Trademarks